United States Patent
Seki et al.

(10) Patent No.: US 11,329,346 B2
(45) Date of Patent: May 10, 2022

(54) BATTERY PACK

(71) Applicant: HONDA MOTOR CO., LTD., Tokyo (JP)

(72) Inventors: Hidemi Seki, Wako (JP); Kanae Ohkuma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 118 days.

(21) Appl. No.: 16/977,468

(22) PCT Filed: Mar. 6, 2018

(86) PCT No.: PCT/JP2018/008582
§ 371 (c)(1),
(2) Date: Sep. 2, 2020

(87) PCT Pub. No.: WO2019/171469
PCT Pub. Date: Sep. 12, 2019

(65) Prior Publication Data
US 2020/0411819 A1 Dec. 31, 2020

(51) Int. Cl.
*H01M 50/291* (2021.01)
*H01M 50/20* (2021.01)
(Continued)

(52) U.S. Cl.
CPC ......... *H01M 50/291* (2021.01); *H01M 50/20* (2021.01); *H01M 50/209* (2021.01);
(Continued)

(58) Field of Classification Search
None
See application file for complete search history.

(56) References Cited

U.S. PATENT DOCUMENTS

2009/0239137 A1* 9/2009 Kakuchi ............. H01M 50/463
429/151
2014/0162105 A1 6/2014 Klausmann et al.

FOREIGN PATENT DOCUMENTS

JP      06188023 A  *  7/1994  ............ H01M 8/247
JP      2012-204081     10/2012
(Continued)

OTHER PUBLICATIONS

International Search Report for corresponding International Application No. PCT/JP2018/008582, dated Apr. 3, 2018.
(Continued)

*Primary Examiner* — Gregg Cantelmo
(74) *Attorney, Agent, or Firm* — Mori & Ward, LLP

(57) ABSTRACT

A battery pack (11) in which a cell stack (15) having a plurality of rectangular cells (14) stacked is housed in an interior of a battery case (12) includes an end plate (20) disposed on one end side in a stacking direction of the cell stack (15), a wedge member (19) disposed on the side of the end plate (20) opposite to the cell stack (15), and a bolt (18) disposed in a bolt screw-in direction that is orthogonal to the stacking direction and urging the wedge member (19) toward a bottom wall (12c) of the battery case (12), and first abutment faces (19b, 20a) via which the wedge member (19) and the end plate (20) abut against each other are formed from an inclined face that is inclined toward the bolt (18) side in the bolt screw-in direction. Therefore, it is possible to apply strong compression to the cell stack (15) with a simple structure and to suppress expansion of the rectangular cell (14), and moreover to enhance the energy density per unit volume while reducing the dimensions and weight of the battery pack (11).

10 Claims, 4 Drawing Sheets

(51) Int. Cl.
*H01M 50/249* (2021.01)
*H01M 50/209* (2021.01)
*H01M 50/242* (2021.01)
*H01M 50/269* (2021.01)

(52) U.S. Cl.
CPC ....... *H01M 50/242* (2021.01); *H01M 50/249* (2021.01); *H01M 50/269* (2021.01); *H01M 2220/20* (2013.01)

(56) References Cited

FOREIGN PATENT DOCUMENTS

| | | |
|---|---|---|
| JP | 2012-256466 | 12/2012 |
| JP | 2014-044884 | 3/2014 |
| JP | 2014-107270 | 6/2014 |
| JP | 2017-004693 | 1/2017 |
| JP | 2018-032519 | 3/2018 |

OTHER PUBLICATIONS

Written Opinion for corresponding International Application No. PCT/JP2018/008582, dated Apr. 3, 2018.

* cited by examiner

BATTERY PACK

TECHNICAL FIELD

The present invention relates to a battery pack in which a cell stack having a plurality of rectangular cells stacked is housed in an interior of a battery case.

BACKGROUND ART

A battery module formed by further stacking a pair of end plates on opposite end parts of a plurality of stacked battery cells, and joining opposite end parts of a pair of ladder frames disposed along the stacking direction of the battery cells to the pair of end plates by means of a bolt, thus integrating the plurality of battery cells while suppressing expansion by applying a compressive force thereto, is known from Patent Document 1 below.

Prior Art Documents

Patent Documents

Patent Document 1: Japanese Patent Application Laid-open No. 2012-256466

SUMMARY OF THE INVENTION

Problems to be Solved by the Invention

Since a conventional battery pack for a vehicle has a structure in which a plurality of battery modules are housed in the interior of a battery case and compression is applied in the direction in which battery cells are stacked, the compression in the battery module state and the compression in the battery pack state overlap, and as result there is the problem that the dimensions and weight of the battery pack increase. Moreover, when the plurality of battery modules are housed in the interior of the battery case, wasted space occurs, and there is a possibility that the energy density per unit volume of the battery pack will decrease.

The present invention has been achieved in light of the above circumstances, and it is an object thereof to enhance the energy density per unit volume of a battery pack by applying compression to a plurality of rectangular cells in the interior of a battery case in a compact manner.

Means for Solving the Problems

In order to attain the above object, according to a first aspect of the present invention, there is provided a battery pack in which a cell stack having a plurality of rectangular cells stacked is housed in an interior of a battery case, wherein the battery pack comprises an end plate disposed on one end side in a stacking direction of the cell stack, a wedge member disposed on the side of the end plate opposite to the cell stack, and a bolt disposed in a bolt screw-in direction that is orthogonal to the stacking direction and urging the wedge member toward a bottom wall of the battery case, first abutment faces via which the wedge member and the end plate abut against each other being formed from an inclined face that is inclined toward the bolt side in the bolt screw-in direction.

Further, according to a second aspect of the present invention, in addition to the first aspect, the battery case is a die-cast metal, and a female thread portion is formed directly in the battery case, the bolt being screwed in the female thread portion.

Furthermore, according to a third aspect of the present invention, in addition to the first or second aspect, the wedge member and a side wall of the battery case are abutted against each other via second abutment faces on the side of the wedge member opposite to the end plate, and the second abutment faces are inclined with respect to the first abutment face at the same angle in opposite directions.

Moreover, according to a fourth aspect of the present invention, in addition to the third aspect, side walls on opposite sides in the stacking direction of the battery case have a plate thickness that is larger than other parts of the battery case.

Further, according to a fifth aspect of the present invention, in addition to the first or second aspect, the wedge member comprises the first abutment face on each of opposite sides in the stacking direction, and a pair of the cell stacks and a pair of the end plates are symmetrically disposed on opposite sides of the wedge member in the stacking direction.

Furthermore, according to a sixth aspect of the present invention, there is provided a battery pack in which a cell stack having a plurality of rectangular cells stacked is housed in an interior of a battery case, wherein the battery pack comprises a wedge member disposed between one end part in a stacking direction of the cell stack and a side wall of the battery case, a bolt disposed in a bolt screw-in direction that is orthogonal to the stacking direction and urging the wedge member toward a bottom wall of the battery case, and a pressing member sandwiched between a head portion of the bolt and the wedge member and being capable of sliding in the stacking direction with respect to the wedge member, abutment faces via which the wedge member and the side wall abut against each other being formed from an inclined face that is inclined toward the bolt side in the bolt screw-in direction.

Moreover, according to a seventh aspect of the present invention, in addition to the sixth aspect, a bearing is disposed between the pressing member and the wedge member.

A first side wall 12a and a second side wall 12b of an embodiment correspond to a side wall of the present invention.

Effects of the Invention

In accordance with the first aspect of the present invention, since the battery pack, in which the cell stack having a plurality of the rectangular cells stacked is housed in the interior of the battery case, includes the end plate disposed on one end side in the stacking direction of the cell stack, the wedge member disposed on the side of the end plate opposite to the cell stack, and the bolt disposed in the bolt screw-in direction orthogonal to the stacking direction and urging the wedge member toward the bottom wall of the battery case, the first abutment faces, via which the wedge member and the end plate abut against each other, being formed from an inclined face that is inclined toward the bolt side in the bolt screw-in direction, when the bolt is screwed in so as to move the wedge member toward the bottom wall side of the battery case, the end plate is moved in the stacking direction by means of the first abutment face, which is an inclined face, and compression is applied to the cell stack in the stacking direction in the interior of the battery case, thereby enabling expansion of the rectangular cell to be suppressed. Since the axial force of the bolt is increased by the wedge effect of the inclined first abutment face and becomes a compressive force for the cell stack, it is possible to apply strong compression to the cell stack with a simple structure and to suppress expansion of the rectangular cell.

It is not necessary to form the battery pack by further applying compression to the plurality of battery modules formed by applying compression to the plurality of cell stacks, the battery pack can be formed by applying compression only once to the plurality of cell stacks, and it is therefore possible to enhance the energy density per unit volume while reducing the dimensions and weight of the battery pack.

Furthermore, in accordance with the second aspect of the present invention, since the battery case is a die-cast metal, and the female thread portion having the bolt being screwed therein is formed directly in the battery case, when the battery case is die cast the female thread portion can be molded easily.

Moreover, in accordance with the third aspect of the present invention, since the wedge member and the side wall of the battery case are abutted against each other via the second abutment faces on the side of the wedge member opposite to the end plate, and the second abutment faces are inclined with respect to the first abutment face at the same angle in opposite directions, it is possible to counteract the reaction force that the wedge member receives from the cell stack with the reaction force that the wedge member receives from the side wall of the battery case, thus preventing the wedge member from tilting.

Furthermore, in accordance with the fourth aspect of the present invention, since the side walls on opposite sides in the stacking direction of the battery case have a plate thickness that is larger than other parts of the battery case, it is possible to impart sufficient strength to the side wall of the battery case, on which a compressive force from the cell stack acts.

Moreover, in accordance with the fifth aspect of the present invention, since the wedge member includes the first abutment face on each of opposite sides in the stacking direction, and the pair of the cell stacks and the pair of the end plates are symmetrically disposed on opposite sides of the wedge member in the stacking direction, it is possible to apply compression to the pair of cell stacks at the same time by means of one wedge member.

Furthermore, in accordance with the sixth aspect of the present invention, since the battery pack, in which the cell stack having a plurality of the rectangular cells stacked is housed in the interior of the battery case, includes the wedge member disposed between one end part in the stacking direction of the cell stack and the side wall of the battery case, the bolt disposed in the bolt screw-in direction orthogonal to the stacking direction and urging the wedge member toward the bottom wall of the battery case, and the pressing member sandwiched between the head portion of the bolt and the wedge member and being capable of sliding in the stacking direction with respect to the wedge member, the abutment faces, via which the wedge member and the side wall abut against each other, being formed from an inclined face that is inclined toward the bolt side in the bolt screw-in direction, when the bolt is screwed in so as to move the wedge member toward the bottom wall side of the battery case, the wedge member is moved in the stacking direction by means of the abutment face, which is an inclined face, and compression is applied to the cell stack in the stacking direction in the interior of the battery case, thereby enabling expansion of the rectangular cell to be suppressed. In this process, since the pressing member can slide in the stacking direction with respect to the wedge member, there is no interference with movement of the wedge member in the stacking direction. Since the axial force of the bolt is increased by the wedge effect of the inclined abutment face and becomes a compressive force for the cell stack, it is possible to apply strong compression to the cell stack with a simple structure.

It is not necessary to form the battery pack by further applying compression to the plurality of battery modules formed by applying compression to the plurality of cell stacks, the battery pack can be formed by applying compression only once to the plurality of cell stacks, and it is therefore possible to enhance the energy density per unit volume while reducing the dimensions and weight of the battery pack.

Moreover, in accordance with the seventh aspect of the present invention, since the bearing is disposed between the pressing member and the wedge member, when the pressing member is pushed by the wedge member by means of the axial force of the bolt, it is possible, by making the wedge member slide smoothly against the pressing member in the stacking direction, to apply sufficient compressive force to the rectangular cell, and it is possible to reliably prevent the bolt from being tilted with respect to the battery case by the frictional force the pressing member receives from the wedge member.

EXPLANATION OF REFERENCE NUMERALS AND SYMBOLS

Figure 1A:
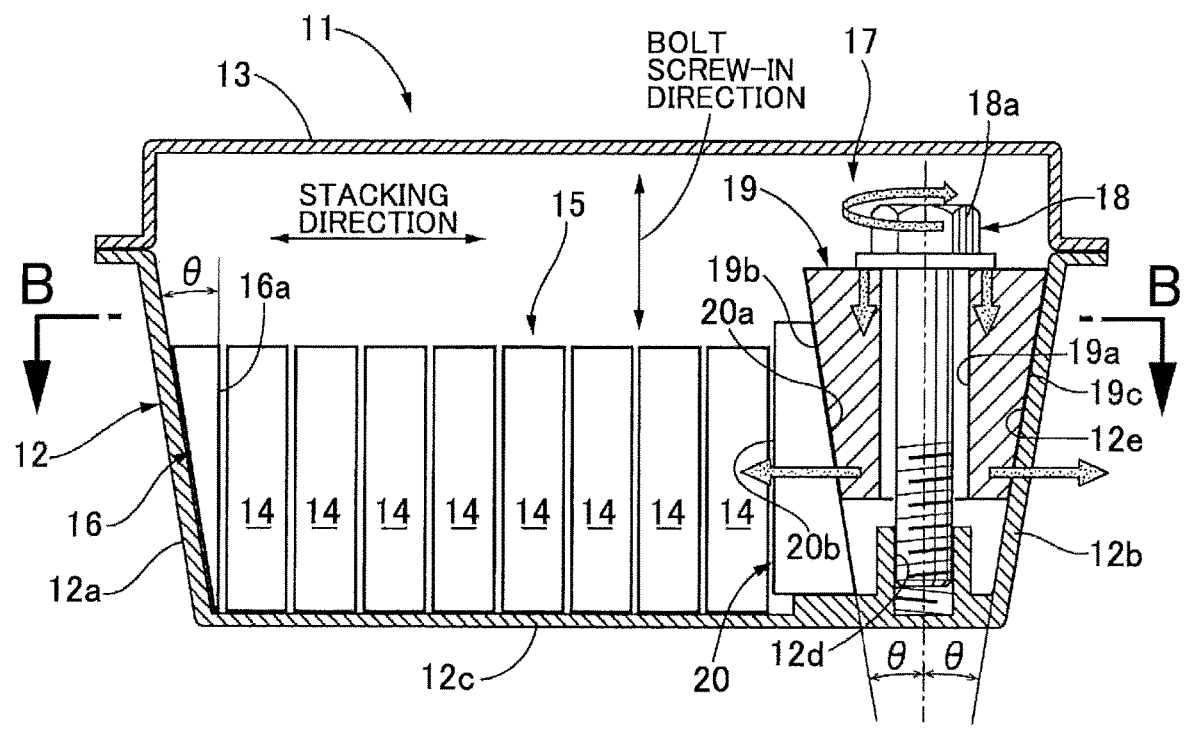
FIGS. 1A and 1B are views showing a battery pack in vertical cross section and horizontal cross section. (first embodiment)

12 Battery case
12a First side wall (side wall)
12b Second side wall (side wall)
12c Bottom wall
12d Female thread portion
12e Second abutment face
12h Abutment face
14 Rectangular cell
15 Cell stack
18 Bolt
18a Head portion
19 Wedge member
19b First abutment face
19c Second abutment face
19f Abutment face
20 End plate
20a First abutment face
21 Bearing
22 Pressing member

MODES FOR CARRYING OUT THE INVENTION

First Embodiment

Figure 1B:
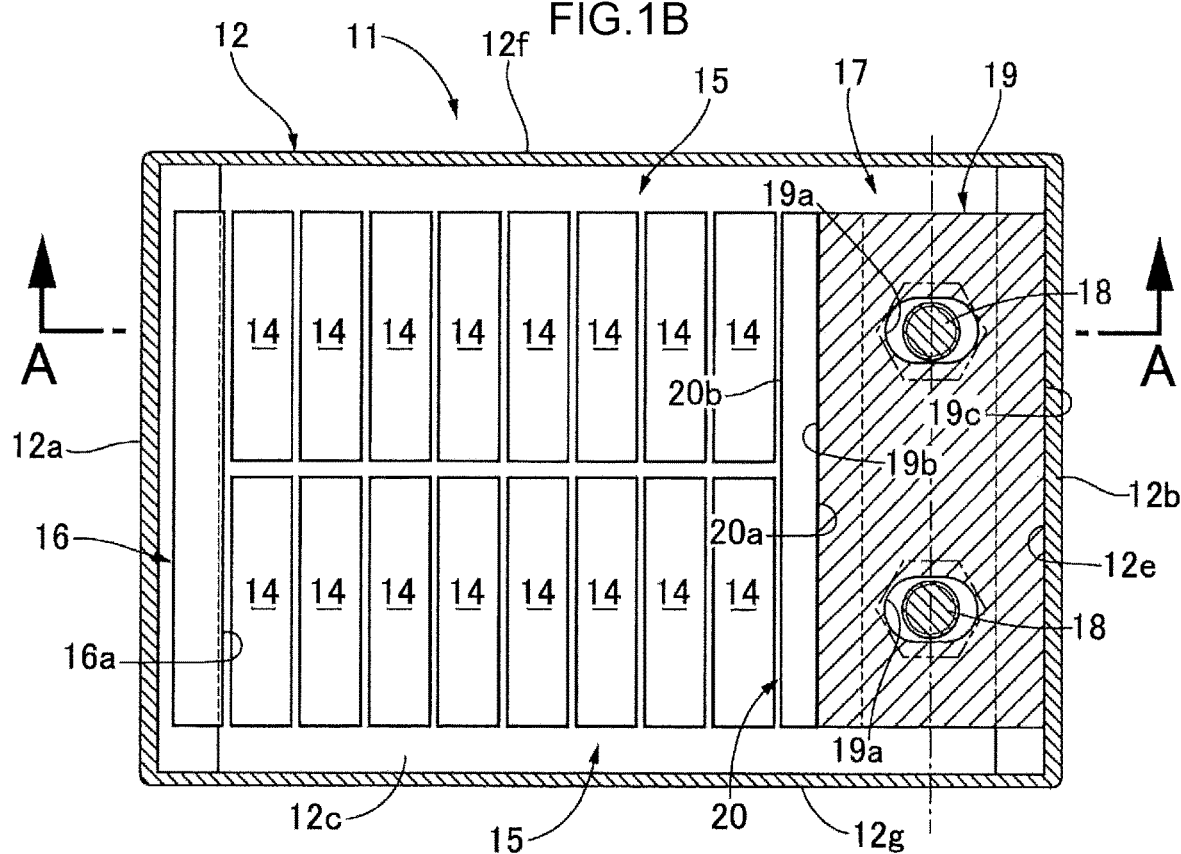

A first embodiment of the present invention is explained below by reference to FIGS. 1A and 1B.

A battery pack 11 is formed by joining a container-shaped battery case 12 having an open upper face and a battery cover 13 blocking the open upper face of the battery case 12 via flange parts thereof. A plurality of rectangular cells 14 having a rectangular parallelepiped shape are housed in the interior of the battery case 12 in a state in which they are stacked in a stacking direction. The plurality of stacked rectangular cells 14 form a cell stack 15, and in the present embodiment two of the cell stacks 15 and 15 are housed in the interior of the battery case 12. Unlike a conventional battery module, in a free state each cell stack 15 has the plurality of rectangular cells 14 simply stacked, and no compression is applied thereto in the stacking direction.

When the battery case 12 is produced by die casting from aluminum, a first side wall 12a and a second side wall 12b, opposing each other, of the battery case 12 are inclined at an angle θ with respect to a direction orthogonal to a bottom wall 12c due to the draft angle. A wedge-shaped spacer 16 is fixed to the first side wall 12a of the battery case 12, and a cell stack-supporting face 16a of the spacer 16 that faces the inside of the battery case 12 is orthogonal to the stacking direction. With regard to the cell stacks 15 and 15 housed in the battery case 12, one end part in the stacking direction opposes the cell stack-supporting face 16a of the spacer 16, and cell compression means 17 is disposed between the other end part in the stacking direction and the second side wall 12b of the battery case 12.

The cell compression means 17 includes two female thread portions 12d and 12d formed in the bottom wall 12c of the battery case 12, two bolts 18 and 18 screwed into the female thread portions 12d and 12d, a wedge member 19 having two bolt holes 19a and 19a formed therein through which the bolts 18 and 18 extend, and an end plate 20 disposed between the other end parts of the cell stacks 15 and 15 and one end face of the wedge member 19.

The bolt holes 19a and 19a of the wedge member 19, through which the bolts 18 and 18 extend, are formed from an elongated hole that is long in the stacking direction. The wedge member 19 includes a first abutment face 19b and a second abutment face 19c that are tapered toward the bottom wall 12c side of the battery case 12, the first abutment face 19b abutting against a first abutment face 20a formed on the end plate 20, and the second abutment face 19c abutting against a second abutment face 12e that is an inner face of the second side wall 12b of the battery case 12. A cell stack-supporting face 20b is formed on the side of the end plate 20 opposite to the first abutment face 20a, the cell stack-supporting face 20b abutting against the other end face of the cell stacks 15 and 15.

The first abutment face 19b of the wedge member 19 and the first abutment face 20a of the end plate 20, which abut against each other, have an inclination angle, with respect to the bolt screw-in direction, of θ, and the second abutment face 19c of the wedge member 19 and the second abutment face 12e of the second side wall 12b of the battery case 12, which abut against each other, also have an inclination angle, with respect to the bolt screw-in direction, of θ. That is, the first abutment faces 19b and 20a and the second abutment faces 19c and 12e are inclined at the same angle θ in opposite directions. Furthermore, the first side wall 12a and the second side wall 12b of the battery case 12 have a plate thickness that is larger than that of the bottom wall 12c, a third side wall 12f and a fourth side wall 12g, which are other wall parts of the battery case 12.

The operation of the embodiment of the present invention having the above arrangement is now explained.

When assembling the cell stacks 15 and 15 in the battery case 12, first, in a state in which the cell stacks 15 and 15 are disposed in the interior of the battery case 12 so that one end part of the cell stacks 15 and 15 is abutted against the cell stack-supporting face 16a of the spacer 16, the cell stack-supporting face 20b of the end plate 20 is abutted against the other end part of the cell stacks 15 and 15. Subsequently, the wedge member 19 is inserted between the end plate 20 and the second side wall 12b of the battery case 12, the bolts 18 and 18 extending through the bolt holes 19a and 19a of the wedge member 19 are screwed into the female thread portions 12d and 12d of the battery case 12, the wedge member 19 thus pushed by the head portions 18a and 18a of the bolts 18 and 18 moves toward the bottom wall 12c side of the battery case 12, the first abutment face 19b of the wedge member 19 abuts against the first abutment face 20a of the end plate 20, and the second abutment face 19c of the wedge member 19 abuts against the second abutment face 12e of the second side wall 12b of the battery case 12.

When in this state the bolts 18 and 18 are screwed in further, the end plate 20 having the first abutment face 20a pushed by the first abutment face 19b of the wedge member 19 moves toward one side in the stacking direction to thus apply compression to the cell stacks 15 and 15 between itself and the spacer 16, thereby suppressing expansion of the rectangular cells 14. When the first abutment face 19b of the wedge member 19 pushes the first abutment face 20a of the end plate 20 leftward in the figure, the wedge member 19 receives a reaction force load from the end plate 20 rightward in the figure, but since the second abutment face 19c of the wedge member 19 pushes the second abutment face 12e of the second side wall 12b of the battery case 12 rightward in the figure and the wedge member 19 receives a reaction force load from the second side wall 12b of the battery case 12 leftward in the figure, the two reaction force loads counteract each other to thus prevent the wedge member 19 from tilting.

Since the first side wall 12a and the second side wall 12b on opposite sides in the stacking direction of the battery case 12, upon which the load from the wedge member 19 acts, have a larger plate thickness than that of the bottom wall 12c, the third side wall 12f, and the fourth side wall 12g, which are other walls of the battery case 12, it is possible to impart sufficient strength to the first side wall 12a and the second side wall 12b, on which the load from the wedge member 19 acts.

With regard to the battery case 12, since the female thread portions 12d and 12d, into which the bolts 18 and 18 are screwed, are formed directly in the battery case 12, which is made by die-casting of a metal, when the battery case 12 is die cast, the female thread portions 12d and 12d can be molded easily. Furthermore, since the bolt holes 19a and 19a of the wedge member 19 are formed from an elongated hole that is long in the stacking direction, even if the wedge member 19 moves in the stacking direction, it is possible to prevent the bolts 18 and 18 from tilting.

A conventional battery pack forms a battery module by applying compression to a plurality of rectangular cells and further applying compression to a plurality of the battery modules, but in the present embodiment since the battery pack 11 is formed by applying compression only once to the plurality of rectangular cells 14 by the cell compression means 17, it is possible to enhance the energy density per unit volume while reducing the dimensions and the weight of the battery pack 11.

Second and Third Embodiments

Second and third embodiments of the present invention are now explained by reference to FIGS. 2A and B.

Figure 2A:
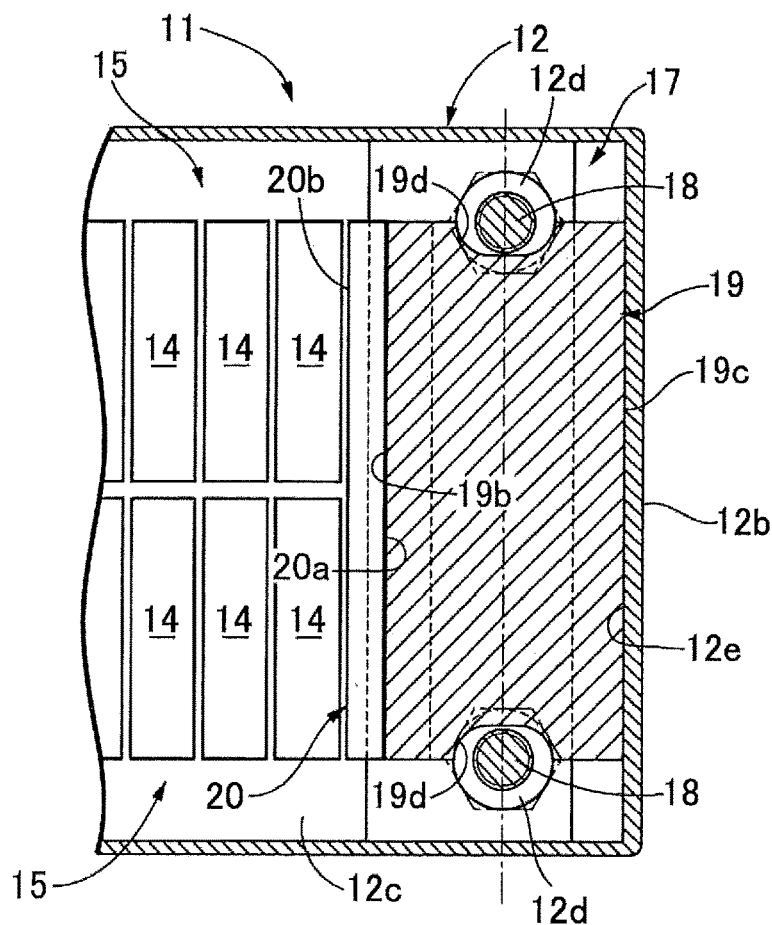
FIGS. 2A and 2B are views showing a battery pack in horizontal cross section. (second and third embodiments)
Figure 2B:
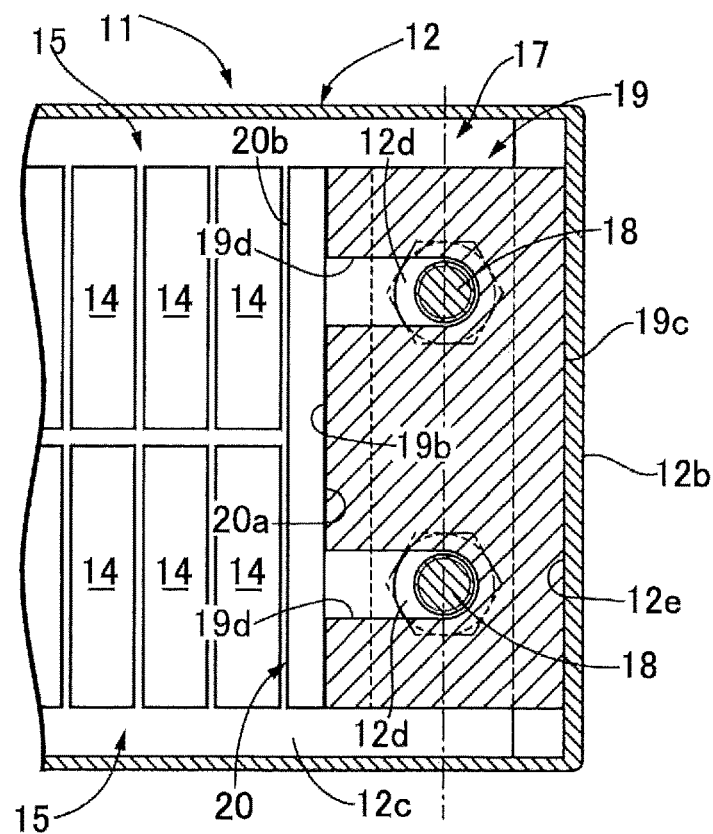

The wedge member 19 of the first embodiment includes the bolt holes 19a and 19a, through which the bolts 18 and 18 extend, but the wedge member 19 of the second embodiment shown in FIG. 2A includes long groove-shaped bolt grooves 19d and 19d having open faces on opposite sides in the longitudinal direction, and the bolts 18 and 18 are fitted into the bolt grooves 19d and 19d from the side. Furthermore, the wedge member 19 of the third embodiment shown in FIG. 2B includes long groove-shaped bolt grooves 19d and 19d that open on the first abutment face 19b, and the bolts 18 and 18 are fitted into the bolt grooves 19d and 19d from the stacking direction.

In accordance with these embodiments, since the bolts 18 and 18 need not be inserted into the bolt holes 19a and 19a but may be fitted into the bolt grooves 19d and 19d from the side or from the stacking direction, assembly of the wedge member 19 by means of the bolts 18 and 18 becomes easy.

Fourth Embodiment

Figure 3A:
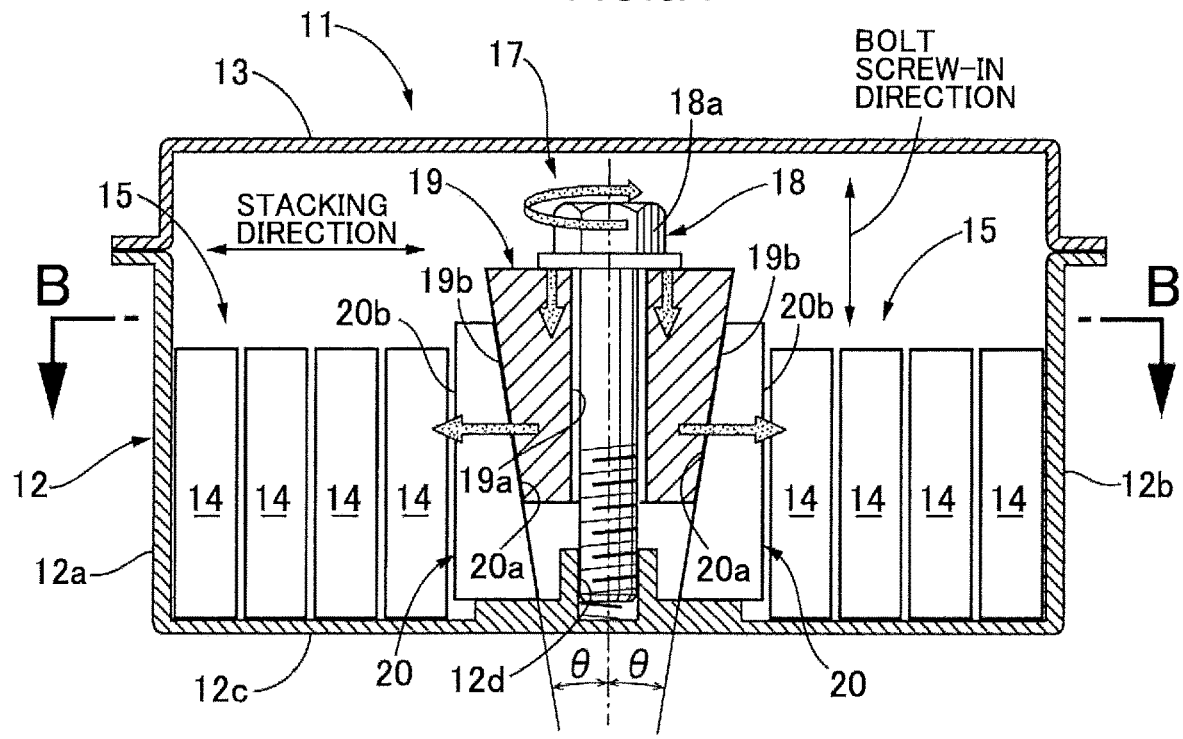
FIGS. 3A and 3B are views showing a battery pack in vertical cross section and horizontal cross section. (fourth embodiment)
Figure 3B:
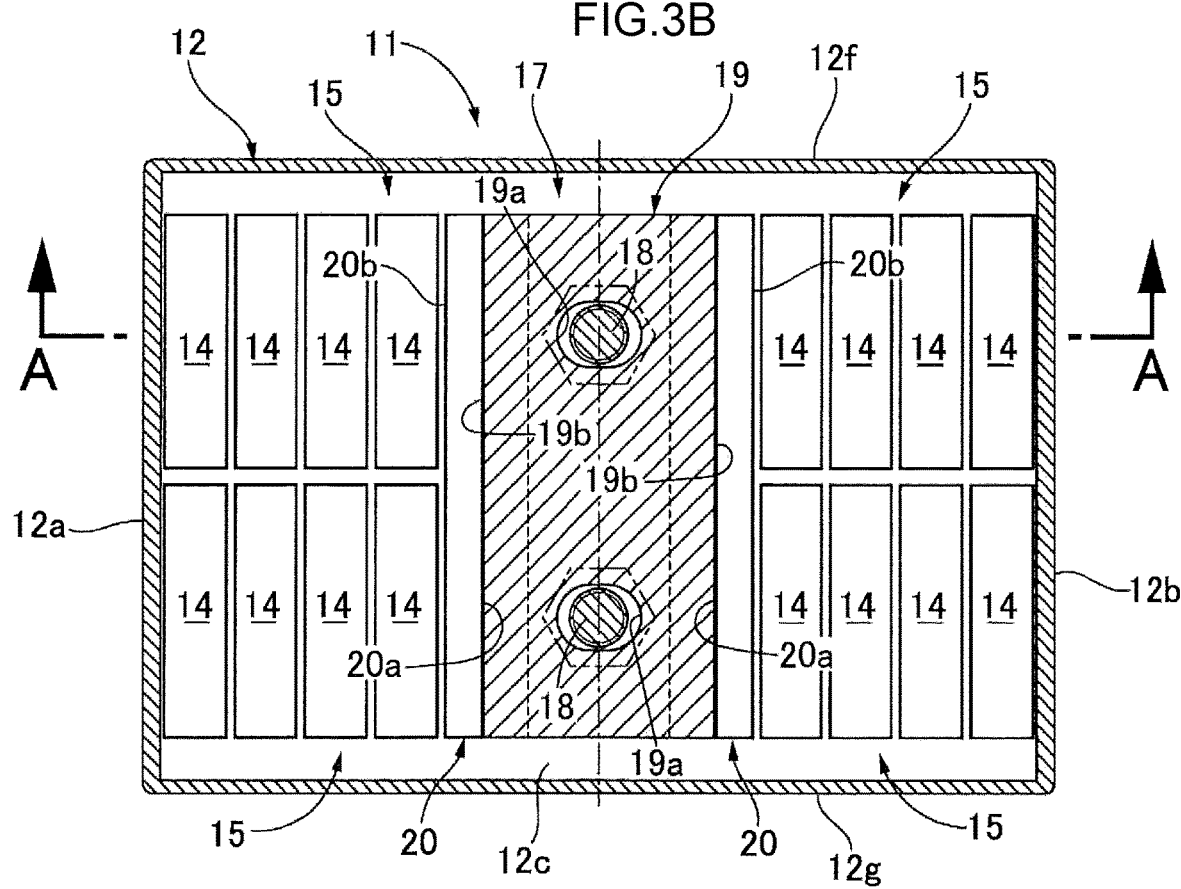

A fourth embodiment of the present invention is now explained by reference to FIGS. 3A and B.

In the battery pack 11 of the fourth embodiment, the cell compression means 17 is disposed in a middle part in the stacking direction of the battery case 12, and the two end plates 20 and 20 and the two cell stacks 15 and 15 are disposed on opposite sides in the stacking direction thereof. The wedge member 19, the bolts 18 and 18, and the female thread portions 12d and 12d of the cell compression means 17 are the same as those of the first embodiment, but it is different from the first embodiment in terms of the end plates 20 and 20 being disposed on opposite sides in the stacking direction of the wedge member 19.

The wedge member 19 includes first abutment faces 19b and 19b on opposite sides in the stacking direction, and each end plate 20 includes a first abutment face 20a abutting against the first abutment face 19b of the wedge member 19 and a cell stack-supporting face 20b abutting against an end part of the cell stacks 15. The first side wall 12a and the second side wall 12b of the battery case 12 rise vertically from the bottom wall 12c without being inclined, and the spacers 16 and 16 of the first embodiment can be eliminated.

In accordance with the present embodiment, when the bolts 18 and 18 are rotated so as to move the wedge member 19 in the bolt screw-in direction, the pair of end plates 20 and 20 having the first abutment faces 20a and 20a pushed by the first abutment faces 19b and 19b of the wedge member 19 move toward opposite sides in the stacking direction, and compression is applied to each of the two cell stacks 15 and 15 between the first side wall 12a and the second side wall 12b of the battery case 12, thus suppressing expansion of the rectangular cells 14. In this process, reaction forces in opposite directions from each other that the two cell stacks 15 and 15 receive from the first side wall 12a and the second side wall 12b of the battery case 12 counterbalance each other in the wedge member 19, thus preventing the wedge member 19 from tilting.

Fifth Embodiment

Figure 4:
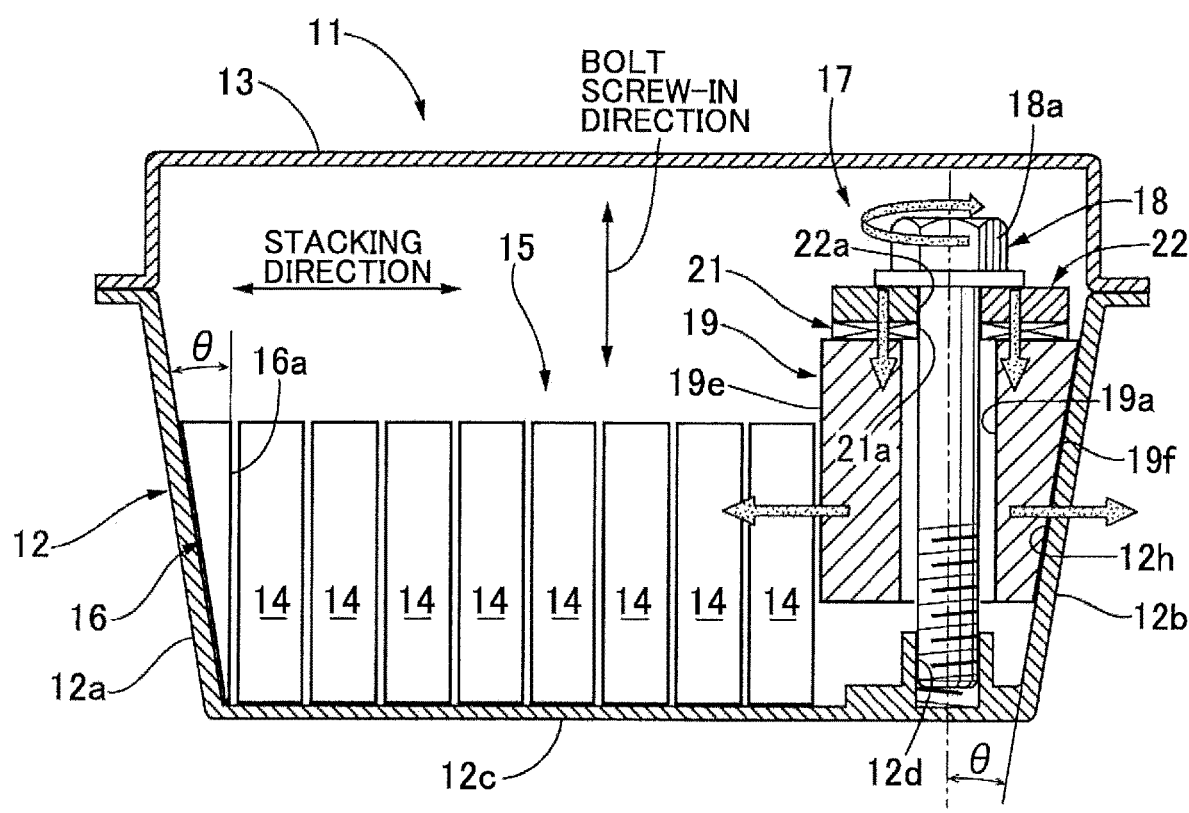
FIG. 4 is a view showing a battery pack in vertical cross section. (fifth embodiment)

A fifth embodiment of the present invention is now explained by reference to FIG. 4.

The cell compression means 17 of the fifth embodiment includes the wedge member 19 disposed between end parts of the cell stacks 15 and 15 and the second side wall 12b of the battery case 12. The wedge member 19 includes a cell stack-supporting face 19e that is parallel to the bolt screw-in direction, and an abutment face 19f that is inclined with respect to the bolt screw-in direction at the angle θ, the cell stack-supporting face 19e is abutted against the end parts of the cell stacks 15 and 15, and the abutment face 19f is abutted against the abutment face 12h of the second side wall 12b of the battery case 12.

A pressing member 22 is superimposed on an upper face of the wedge member 19 with a sheet-shaped bearing 21 held therebetween, and the bolts 18 and 18 extend through bolt holes 22a and 22a of the pressing member 22, bolt holes 21a and 21a of the bearing 21, and bolt holes 19a and 19a of the wedge member 19 and are screwed into the female thread portions 12d and 12d of the battery case 12. The bolt holes 19a and 19a of the wedge member 19 are elongated holes that are long in the stacking direction as in the first embodiment, but the bolt holes 22a and 22a of the pressing member 22 and the bolt holes 21a and 21a of the bearing 21 are round holes through which the bolts 18 and 18 extend without a gap.

In accordance with the present embodiment, when the pressing member 22, the bearing 21 and the wedge member 19 are moved in the bolt screw-in direction by screwing the bolts 18 and 18 into the female thread portions 12d and 12d, the inclined abutment face 19f of the wedge member 19 and the inclined abutment face 12h of the second side wall 12b of the battery case 12 are abutted against each other, and the wedge member 19 moves leftward in the figure within the range of the elongated hole-shaped bolt holes 19a and 19a to thus apply compression to the cell stacks 15 and 15 between itself and the spacer 16 provided on the first side wall 12a of the battery case 12, thereby suppressing expansion of the rectangular cells 14.

When the wedge member 19 moves leftward in the figure due to the abutment faces 19f and 12h abutting against each other, the wedge member 19 is displaced relative to the pressing member 22, which is non-movably restrained by the bolts 18 and 18, but since the bearing 21 is sandwiched between the wedge member 19 and the pressing member 22, the frictional force will not interfere with movement of the wedge member 19 in the stacking direction.

Moreover, since the reaction force that faces rightward in the figure and that the cell stack-supporting face 19e of the wedge member 19 receives from the cell stacks 15 and 15 is counteracted by the reaction force that faces leftward in the figure and that the abutment face 19f of the wedge member 19 receives from the abutment face 12h of the second side wall 12b of the battery case 12, the wedge member 19 is prevented from tilting.

Embodiments of the present invention are explained above, but the present invention may be modified in a variety of ways as long as the modifications do not depart from the subject matter.

For example, in the embodiments two rows of the cell stacks 15 are disposed in the interior of battery case 12, but one row or three or more rows may be disposed.

Furthermore, in the embodiment the bearing 21 is disposed between the pressing member 22 and the wedge member 19, but instead of the bearing 21 being disposed a lubricating material such as a grease may be applied.

The invention claimed is:

1. A battery pack in which a cell stack having a plurality of rectangular cells stacked is housed in an interior of a battery case, wherein the battery pack comprises an end plate disposed on one end side in a stacking direction of the cell stack, a wedge member disposed on the side of the end plate opposite to the cell stack, and a bolt disposed in a bolt screw-in direction that is orthogonal to the stacking direction and urging the wedge member toward a bottom wall of the battery case, first abutment faces via which the wedge member and the end plate abut against each other being formed from an inclined face that is inclined toward the bolt side in the bolt screw-in direction.

2. The battery pack according to claim 1, wherein the battery case is a die-cast metal, and a female thread portion is formed directly in the battery case, the bolt being screwed in the female thread portion.

3. The battery pack according to claim 1, wherein the wedge member and a side wall of the battery case are abutted against each other via second abutment faces on the side of the wedge member opposite to the end plate, and the second abutment faces are inclined with respect to the first abutment face at the same angle in opposite directions.

4. The battery pack according to claim 3, wherein side walls on opposite sides in the stacking direction of the battery case have a plate thickness that is larger than other parts of the battery case.

5. The battery pack according to claim 1, further comprising a second cell stack and a second end plate, wherein the wedge member comprises a first abutment face on each of opposite sides in the stacking direction, and the pair of cell stacks and the pair of end plates are symmetrically disposed on opposite sides of the wedge member in the stacking direction.

6. A battery pack in which a cell stack having a plurality of rectangular cells stacked is housed in an interior of a battery case,
wherein the battery pack comprises a wedge member disposed between one end part in a stacking direction of the cell stack and a side wall of the battery case, a bolt disposed in a bolt screw-in direction that is orthogonal to the stacking direction and urging the wedge member toward a bottom wall of the battery case, and a pressing member sandwiched between a head portion of the bolt and the wedge member and being capable of sliding in the stacking direction with respect to the wedge member, abutment faces via which the wedge member and the side wall abut against each other being formed from an inclined face that is inclined toward the bolt side in the bolt screw-in direction.

7. The battery pack according to claim 6, wherein a bearing is disposed between the pressing member and the wedge member.

8. The battery pack according to claim 2, wherein the wedge member and a side wall of the battery case are abutted against each other via second abutment faces on the side of the wedge member opposite to the end plate, and the second abutment faces are inclined with respect to the first abutment face at the same angle in opposite directions.

9. The battery pack according to claim 8, wherein side walls on opposite sides in the stacking direction of the battery case have a plate thickness that is larger than other parts of the battery case.

10. The battery pack according to claim 2, further comprising a second cell stack and a second end plate, wherein the wedge member comprises a first abutment face on each of opposite sides in the stacking direction, and the pair of cell stacks and the pair of end plates are symmetrically disposed on opposite sides of the wedge member in the stacking direction.

* * * * *